US008838604B1

(12) United States Patent
Osinga

(10) Patent No.: US 8,838,604 B1
(45) Date of Patent: Sep. 16, 2014

(54) LABELING EVENTS IN HISTORIC NEWS

(75) Inventor: Douwe Osinga, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/615,922

(22) Filed: Sep. 14, 2012

Related U.S. Application Data

(63) Continuation of application No. 12/773,601, filed on May 4, 2010, now Pat. No. 8,332,399, which is a continuation of application No. 11/239,684, filed on Sep. 30, 2005, now Pat. No. 7,739,254.

(51) Int. Cl.
*G06F 17/30* (2006.01)
*G06F 7/00* (2006.01)

(52) U.S. Cl.
USPC ........................... 707/737; 707/750; 707/758

(58) Field of Classification Search
USPC ......................................... 707/737, 750, 758
See application file for complete search history.

(56) References Cited

U.S. PATENT DOCUMENTS

| | | | |
|---|---|---|---|
| 6,363,379 B1* | 3/2002 | Jacobson et al. ........................ 1/1 |
| 6,532,469 B1* | 3/2003 | Feldman et al. ............. 707/750 |
| 6,629,097 B1 | 9/2003 | Keith |
| 7,359,891 B2 | 4/2008 | Nishino et al. |
| 7,739,254 B1 | 6/2010 | Osinga |
| 8,332,399 B1 | 12/2012 | Osinga |
| 2002/0169764 A1* | 11/2002 | Kincaid et al. ..................... 707/3 |
| 2003/0046313 A1* | 3/2003 | Leung et al. .................. 707/204 |
| 2004/0093322 A1 | 5/2004 | Peralta et al. |
| 2004/0225667 A1 | 11/2004 | Hu et al. |
| 2004/0247206 A1* | 12/2004 | Kaneda et al. ................ 382/305 |
| 2004/0250261 A1* | 12/2004 | Huibregtse .................... 719/318 |
| 2005/0102614 A1* | 5/2005 | Brockett et al. .............. 715/513 |
| 2005/0203970 A1* | 9/2005 | McKeown et al. ............ 707/203 |
| 2005/0246410 A1 | 11/2005 | Chen et al. |
| 2008/0133510 A1 | 6/2008 | Timmons |

OTHER PUBLICATIONS

The MathWorks, Matlab, Using Matlab Graphics, Version 7, 2004, Section 3—How to Annotate Graphs.*

* cited by examiner

*Primary Examiner* — Alicia Lewis
(74) *Attorney, Agent, or Firm* — Harrity & Harrity, LLP

(57) ABSTRACT

A system identifies a set of documents from a corpus of documents that are relevant to a word, phrase or sentence and that were published at approximately a same time period, where each document of the set of documents includes news content and has an associated headline. The system extracts headlines from the set of documents and derives a score for each headline of the extracted headlines based on how many times selected words in each headline occurs among all of the extracted headlines.

20 Claims, 9 Drawing Sheets

| KEY 520 | TIMESTAMP 530 | HEADLINES 540 |
|---|---|---|
| key_x | TS1 | HL11, HL12, HL13,..., HL1M |
| | TS2 | HL21, HL22, HL23,..., HL2M |
| | TS3 | HL31, HL32, HL33,..., HL3M |
| | --- | --- |
| | TSN | HLN1, HLN2, HLN3,..., HLNM |

LABELING EVENTS IN HISTORIC NEWS

RELATED APPLICATION

This application is a Continuation of U.S. patent application Ser. No. 12/773,601, filed May 4, 2010, which is a Continuation of U.S. patent application Ser. No. 11/239,684, filed Sep. 30, 2005 (now U.S. Pat. No. 7,739,254). The entire contents of these applications are incorporated by reference herein.

BACKGROUND

1. Field of the Invention

Implementations described herein relate generally to accessing and retrieving news content and, more particularly, to graphically displaying and labeling news events over time.

2. Description of Related Art

Existing news aggregation services (e.g., Google News) search out, and aggregate, news content published on web pages throughout the Internet. In response to a search query from a user, the news aggregation service presents a list of stories, from the aggregated news content, relevant to the query with each story involving a group of articles from different publications dealing with the same topic. The user may select from the presented list of stories which news content documents that the user desires to read. To keep abreast of developments in the news, users periodically access the news aggregation service, re-enter a search query and view relevant news stories.

SUMMARY

According to one aspect, a method may include extracting a plurality of headlines associated with a set of documents and determining a frequency of occurrence of selected words in the plurality of headlines. The method may further include determining a score for each headline of the plurality of headlines based on the determined frequency of occurrence associated with ones of the selected words included in each headline. The method may also include selecting a headline from the plurality of headlines with one of the highest of the determined scores According to another aspect, a method may include receiving a query and determining a number of occurrences per unit time of at least a portion of the query in a plurality of documents having news content. The method may further include graphing the number of occurrences per unit time over a span of time.

According to a further aspect, a method may include identifying a set of documents from a corpus of documents that are relevant to a word, phrase or sentence and that were published at approximately a same time period, where each document of the set of documents includes news content and has an associated headline. The method may further include extracting headlines from the set of documents and deriving a score for each headline of the extracted headlines based on how many times selected words in each headline occurs among all of the extracted headlines.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 5-8 are diagrams of exemplary data structures consistent with principles of the invention.

DETAILED DESCRIPTION

The following detailed description of the invention refers to the accompanying drawings. The same reference numbers in different drawings may identify the same or similar elements. Also, the following detailed description does not limit the invention.

Consistent with aspects of the invention, a graph of the occurrence of a given word, phrase or sentence in news documents hosted by news sources over time may be provided. The graph may plot the number of times the given word, phrase or sentence occurs per unit time and may further label peaks in the plotted curve with the most relevant news headlines.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

OVERVIEW

Figure 1:
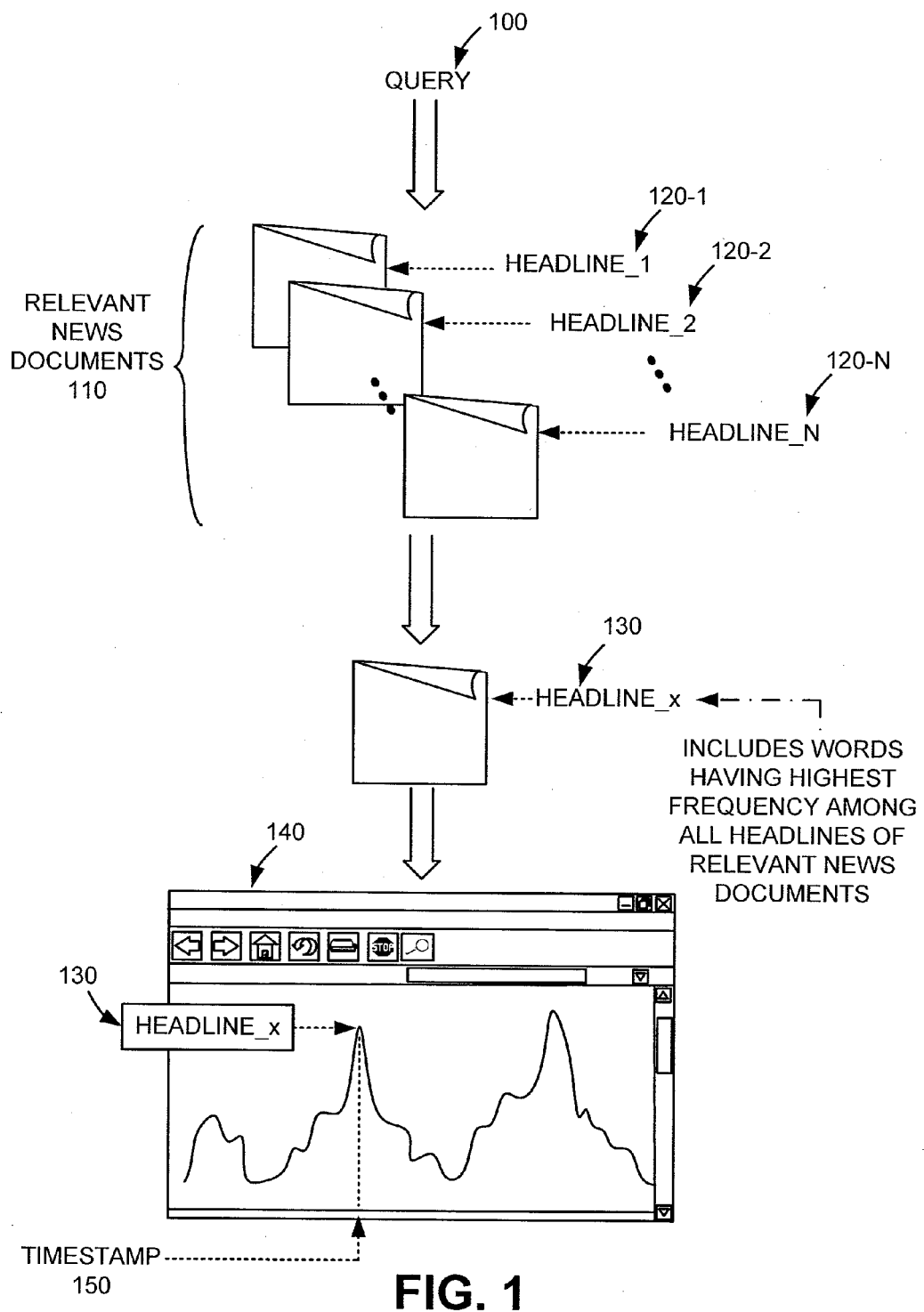
FIG. 1 is an exemplary diagram of an overview of an implementation of the invention.

FIG. 1 illustrates an exemplary overview of an implementation of the invention that plots how often a given term, phrase or sentence appeared in news documents hosted by news sources, along with labels that identify the most important or most relevant events. As shown in FIG. 1, a query 100 may be used to search a repository of aggregated news documents (not shown) to retrieve a set of news documents 110 that are relevant to query 100. A news aggregation service may crawl a corpus of news content documents hosted on news source servers and store information associated with these news content documents in a repository of crawled documents. The repository of crawled documents may be searched, using query 100 and existing document searching techniques, to identify news documents 110 that are relevant to query 100. Each document of the relevant news documents 110 may have a headline 120 associated with it. Each document of the relevant news documents 110 may also have a timestamp (not shown) associated with it that identifies a time and/or date when the document was published. Relevant news documents 110 may include a set of documents, with each document being relevant to query 100 and having a same, or similar, timestamp.

All words contained in headlines 120-1 through 120-N of relevant news documents 110 may be extracted. A frequency of occurrence of each of the words extracted from headlines 120-1 through 120-N may be determined among all of the headlines. A headline 130 from headlines 120-1 through 120-N may be identified that includes words having the highest frequency of occurrence among all headlines 120-1 through 120-N of relevant news documents 110. Headline 130, thus, may include one of headlines 120-1 through 120-N with the most words having the highest frequencies of occurrence among all of the headlines 120-1 through 120-N.

A graph 140 may be plotted that shows how often a certain word, phrase or sentence of query 100 appeared in relevant news documents 110 over a period of time. Headline 130, that includes the most words having the highest frequencies of occurrence among all of the headlines 120-1 through 120-N, may be used to label a peak of a graph 140 at a corresponding timestamp 160 associated with relevant news documents 110.

Exemplary Network Configuration

Figure 2:
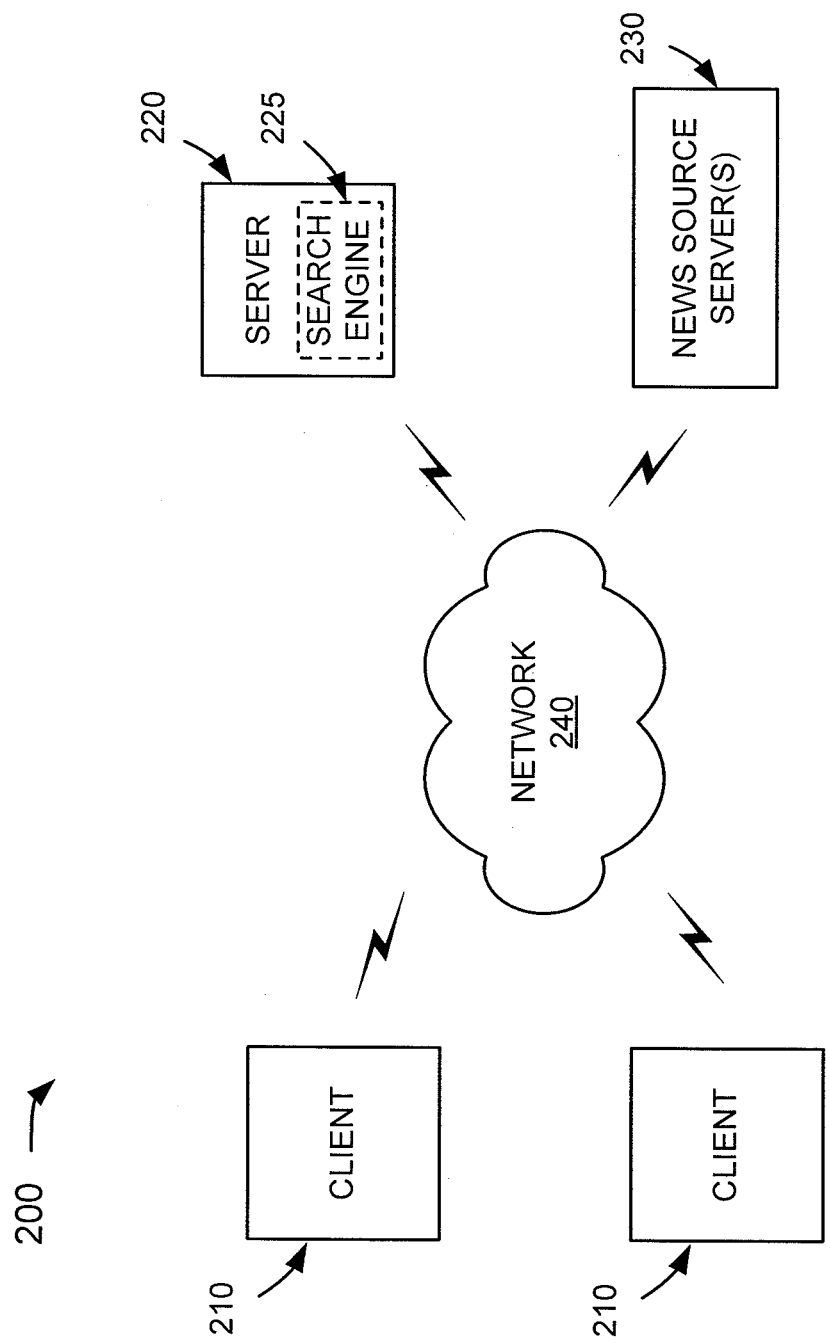
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to one or more servers 220-230 via a network 240. Two clients 210 and two servers 220-230 have been illustrated as connected to network 240 for simplicity. In practice, there may be more or fewer clients and servers. Also, in some instances, a client may perform one or more functions of a server and a server may perform one or more functions of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220 and 230 may include server entities that access, fetch, aggregate, process, search, and/or maintain documents in a manner consistent with the principles of the invention. Clients 210 and servers 220 and 230 may connect to network 240 via wired, wireless, and/or optical connections.

In an implementation consistent with the principles of the invention, server 220 may include a search engine 225 usable by users at clients 210. Server 220 may implement a news aggregation service by crawling a corpus of news content documents (e.g., web pages) hosted on news source server(s) 230, indexing the news content documents, and storing information associated with these news content documents in a repository of crawled documents. The news aggregation service may be implemented in other ways, such as by agreement with the operator(s) of news source server(s) 230 to distribute their news content documents via the news aggregation service. Search engine 225 may execute a search using a query, received from a user at a client 210, on the corpus of news documents stored in the repository of crawled documents. Server 220 may provide, to a user issuing a query, a graph of how often a word, phrase, or sentence appears in the news content documents, as described in more detail below.

New source server(s) 230 may store or maintain news content documents that may be crawled by server 220. Such news content documents may include recently published news stories, or older (i.e., not recent), archived news stories from any type of news source, such as, for example, the Washington Post, the New York Times, Time magazine, or Newsweek.

While servers 220-230 are shown as separate entities, it may be possible for one of servers 220-230 to perform one or more of the functions of the other one of servers 220-230. For example, it may be possible that servers 220 and 230 are implemented as a single server. It may also be possible for a single one of servers 220 and 230 to be implemented as two or more separate (and possibly distributed) devices.

Network 240 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

Exemplary Client/Server Architecture

Figure 3:
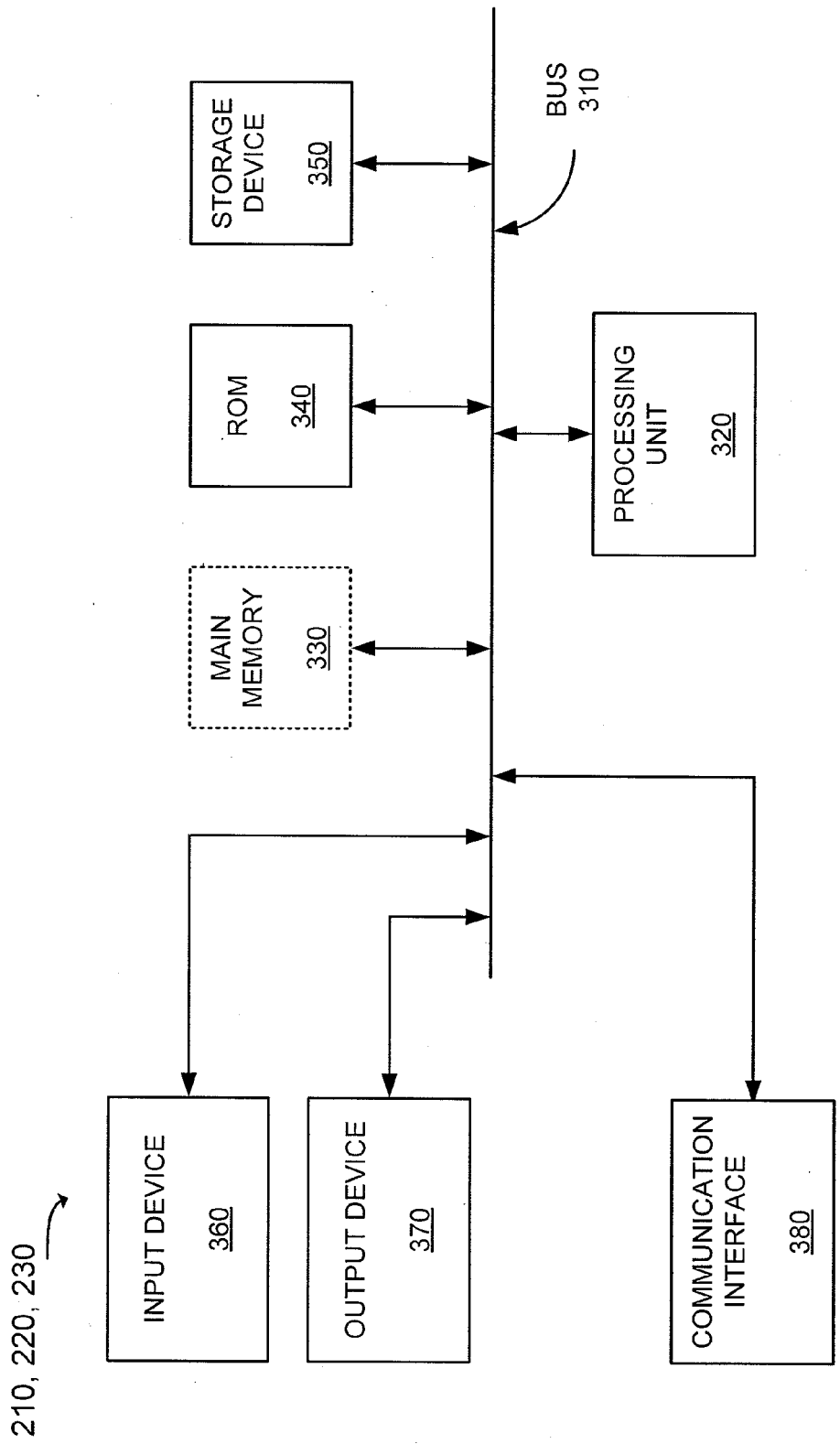
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-230, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

The client/server entity, consistent with the principles of the invention, may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Historic News Graphing and Labeling Process

Figure 4A:
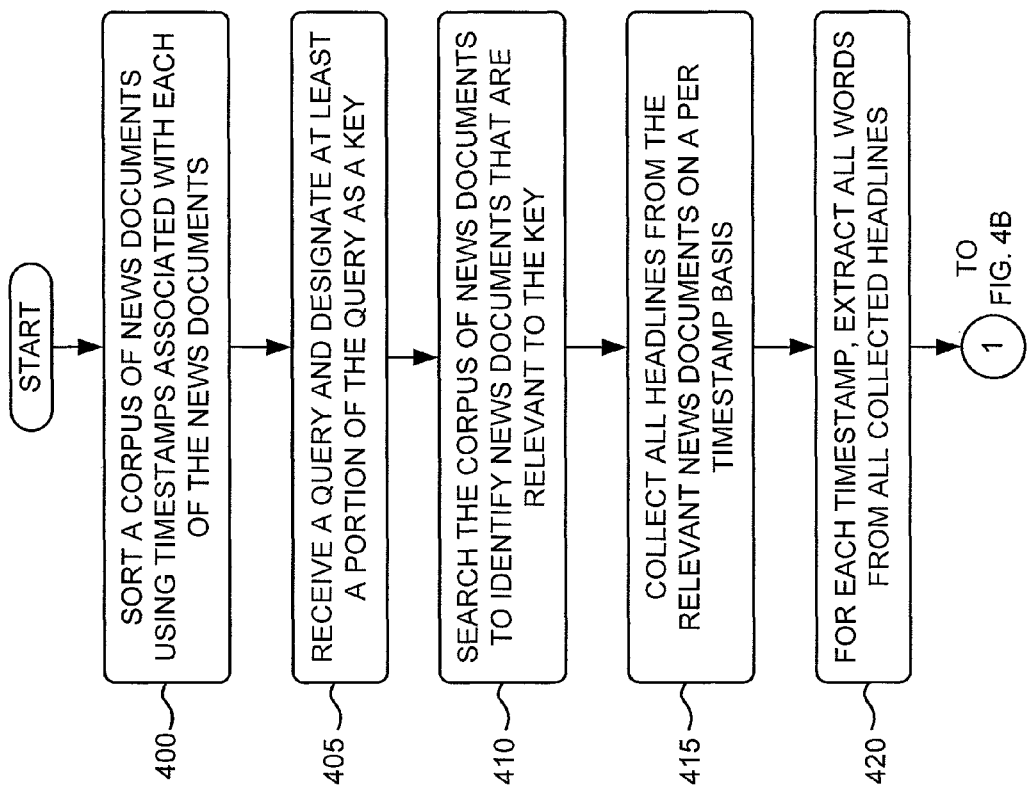
FIGS. 4A & 4B is a flowchart of an exemplary process for labeling a plot of historic news consistent with principles of the invention.
Figure 4B:
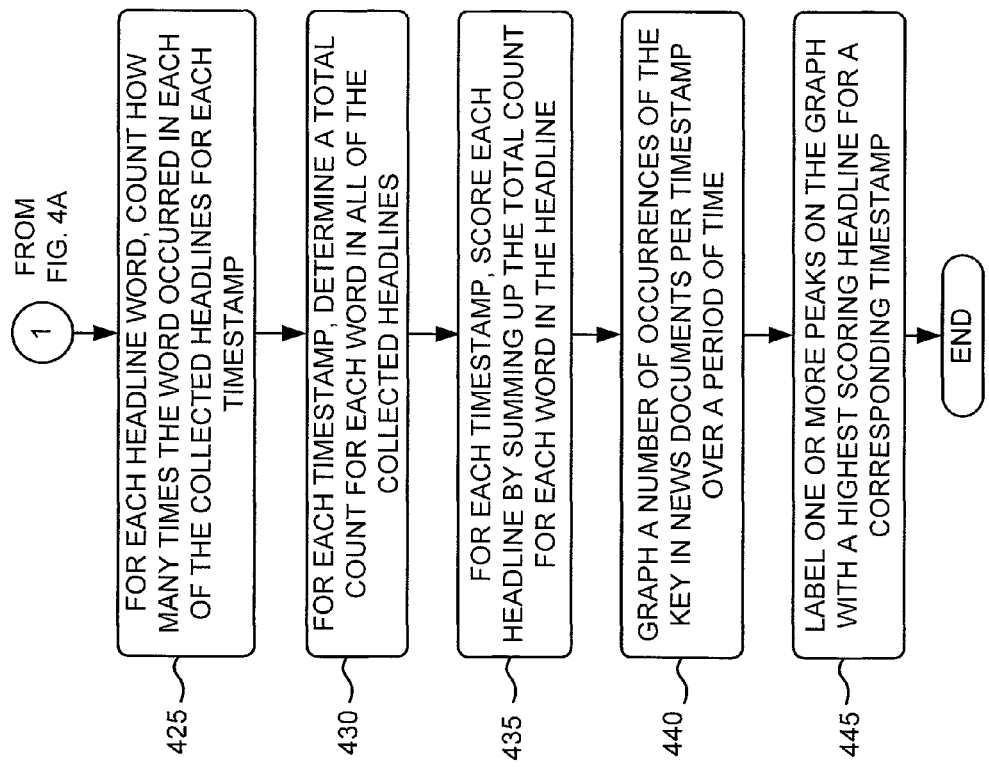

FIGS. 4A & 4B is a flowchart of an exemplary process for graphing how often a certain word, phrase or sentence appears in historic news, with the graph being labeled with the most important news events. The process exemplified by FIG. 4 may be performed by server 220, or by another entity separate from, or in conjunction with, server 220.

The exemplary process may begin with the receipt of a query and the designation of at least a portion of the query as a "key" (block 400). The "key" may include a portion of the received query, such as, for example, a word, phrase or sentence of the received query. In one implementation, the "key" may include all words in the received query except for "stop" words (e.g., a, the, of, etc.). The query may be received by server 220 from a user at a client 210. A corpus of news documents may be sorted using timestamps associated with each of the news documents (block 405). The corpus of news documents may include information stored in a repository of crawled news content documents by server 220. For example, if a corpus of news documents includes documents $D_x$, $D_y$, $D_z$, $D_p$ and $D_q$, having respective timestamps $t_4$, $t_5$, $t_1$, $t_3$ and $t_2$, then the documents may be sorted in an order corresponding to the respective timestamps: $D_z$, $D_q$, $D_p$, $D_x$ and $D_y$. The corpus of news documents may be searched to identify news documents that are relevant to the key (block 410). Existing searching techniques may be used to identify the news documents from the repository of crawled documents that are relevant to the key. For example, news documents whose content includes the key may be identified as being relevant to the key. As a specific example, a document with a headline "Lance Armstrong wins Tour de France" may be identified as being relevant to the key "Tour de France" or "bicycling" (e.g., a word that might be in the document content, but not in the document headline).

All headlines from the relevant news documents may be collected on a per timestamp basis (block 415). For example, if documents $D_1$, $D_2$ and $D_3$ have a same timestamp $t_x$ and also have headlines $HL_1$, $HL_2$ and $HL_3$, then headlines $HL_1$, $HL_2$ and $HL_3$ may be collected. A "headline" as the term is used herein may include any type of label or identifying data associated with a given document that can serve as a "title" for the document. For example, a "headline" may include a textual portion of a document located at a prominent position (e.g., at the beginning) on the document, or otherwise distinguished by its location, size (e.g., larger font), or color. A "headline" may also include other data extracted from a document, such as, for example, metadata that may indicate a title, or subject matter, of the document. Collected headlines for the news document that are relevant to the key, and their associated timestamps, may be stored in a data structure, such as, data structure 500 shown in FIG. 5. As shown in FIG. 5, data structure 500 may include multiple entries 510 associated with a single key entry 520. Key entry 520 may store a given key used to identify relevant news documents. Each entry 510 may include a timestamp 530 and a collection of headlines 540. Timestamp 530 may identify the timestamp (e.g., the publication date and/or time) associated with the identified relevant news documents. Headlines 540 may store the headlines collected from all of the identified relevant news documents.

Figure 6:
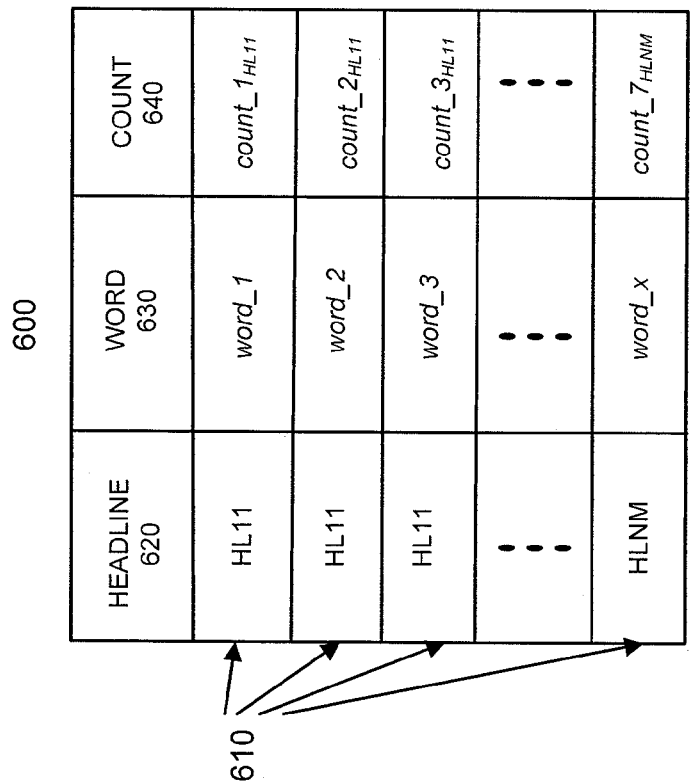

For each timestamp, all words (possibly excluding common stop words, such as, "a," "the," "of," "an," etc.) may be extracted from all of the collected headlines for that timestamp (block 420). For example, if headlines HL1, HL2 and HL3 are associated with relevant news documents at timestamp $t_y$, and HL1 has words word__1, word__2 and word__3, HL2 has words word__2, word__4 and word__5, and HL3 has words word__3, word__6, word__7 and word__8, words word__1, word__2, word__3, word__4, word__5, word__6, word__7 and word__8 may be extracted from all of the headlines. As shown in FIG. 6, each word extracted from the collected headlines may be stored in an entry 610 of a data structure 600 that corresponds to a given timestamp. Entry 610 may include a headline 620 and a word 630. Each extracted word may be stored in a word entry 630 that corresponds to the headline from which the word was extracted (e.g., a corresponding headline 620).

For each headline word (possibly excluding common stop words, such as, "a," "the," "of," "an," etc.), how many times the word occurred in each of the headlines for each timestamp may be counted (block 425). For example, if headlines HL1, HL2 and HL3 are associated with relevant news documents at timestamp $t_y$, and HL1 has words word__1, word__2 and word__3, HL2 has words word__2, word__4 and word__5, and HL3 has words word__3, word__6, word__7 and word__8, then words word__1, word__2, word__3, word__4, word__5, word__6, word__7 and word__8 will each have a count of 1 for the headline in which they occur. As shown in FIG. 6, a count value 640, that identifies the number of times a given word occurs in a given headline, may be stored in an entry that corresponds to a respective headline 620 and word 630.

Figure 7:
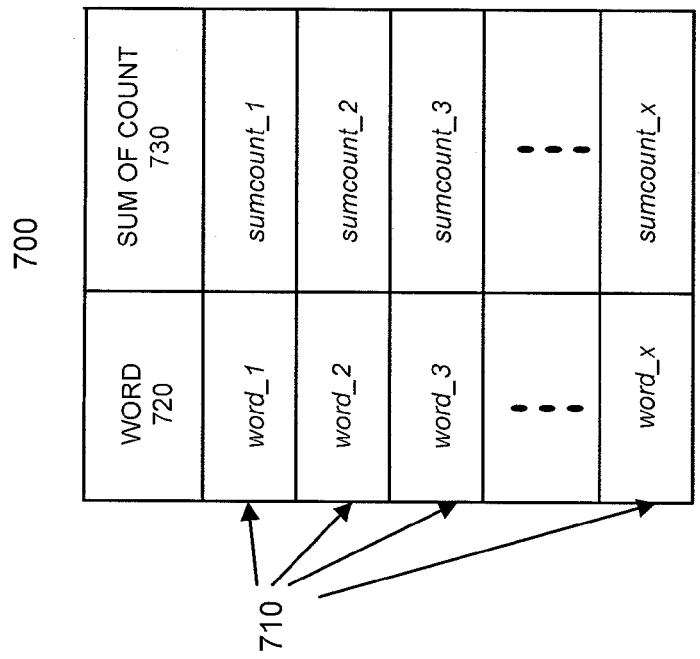

For each timestamp, a total count for each word (possibly excluding common stop words, such as, "a," "the," "of," "an," etc.) in all of the collected headlines may be determined (block 430). The total count may be determined by summing word counts for each headline as determined in block 425 above. For example, returning to the previous example, if headlines HL1, HL2 and HL3 are associated with relevant news documents at timestamp $t_y$, and HL1 has words word__1, word__2 and word__3, HL2 has words word__2, word__4 and word__5, and HL3 has words word__3, word__6, word__7 and word__8, then words word__1, word__4, word__5, word__6, word__7 and word__8 will each have a total count of 1, and words word__2 and word__3 will have a total count of 2. For every word in word entries 630 of data structure 600 that matches another word, their respective count values 640 may be summed. The total sum may be stored in another data structure 700, as shown in FIG. 7. Each entry 710 of data structure 700 may include a word 720 and a corresponding sum of count value 730. Word 720 may identify each word that occurs in a headline of the collected headlines, and sum of count value 730 may count the total number of occurrences of a respective word in all of the collected headlines. For example, if the word "hurricane" occurs 20 times in 20 different headlines, then the sum of count value 730 would be 20.

Figure 8:
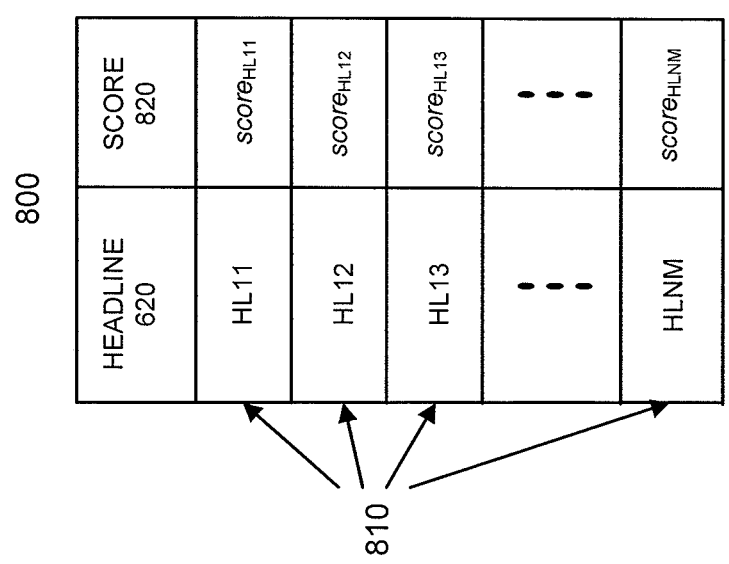

For each timestamp, each headline may be scored by summing up the total count for each word (possibly excluding common stop words, such as, "a," "the," "of," "an," etc.) in the headline (block 435). For example, if headline $HL_x$ includes words word__1, word__2, word__3 and word__4, and these words have respective total counts 5, 10, 15 and 20, then the score for $HL_x$ may equal 5+10+15+20=40. For each word of a given headline, a matching word entry 720 of data structure 700 may be identified and a respective sum of count value 730 may be extracted to sum with count values 730 of other words in the given headline. As shown in FIG. 8, the score for each headline may be stored as a score value 820 in an entry 810 of a data structure 800 that corresponds to a respective headline 620.

Figure 9:
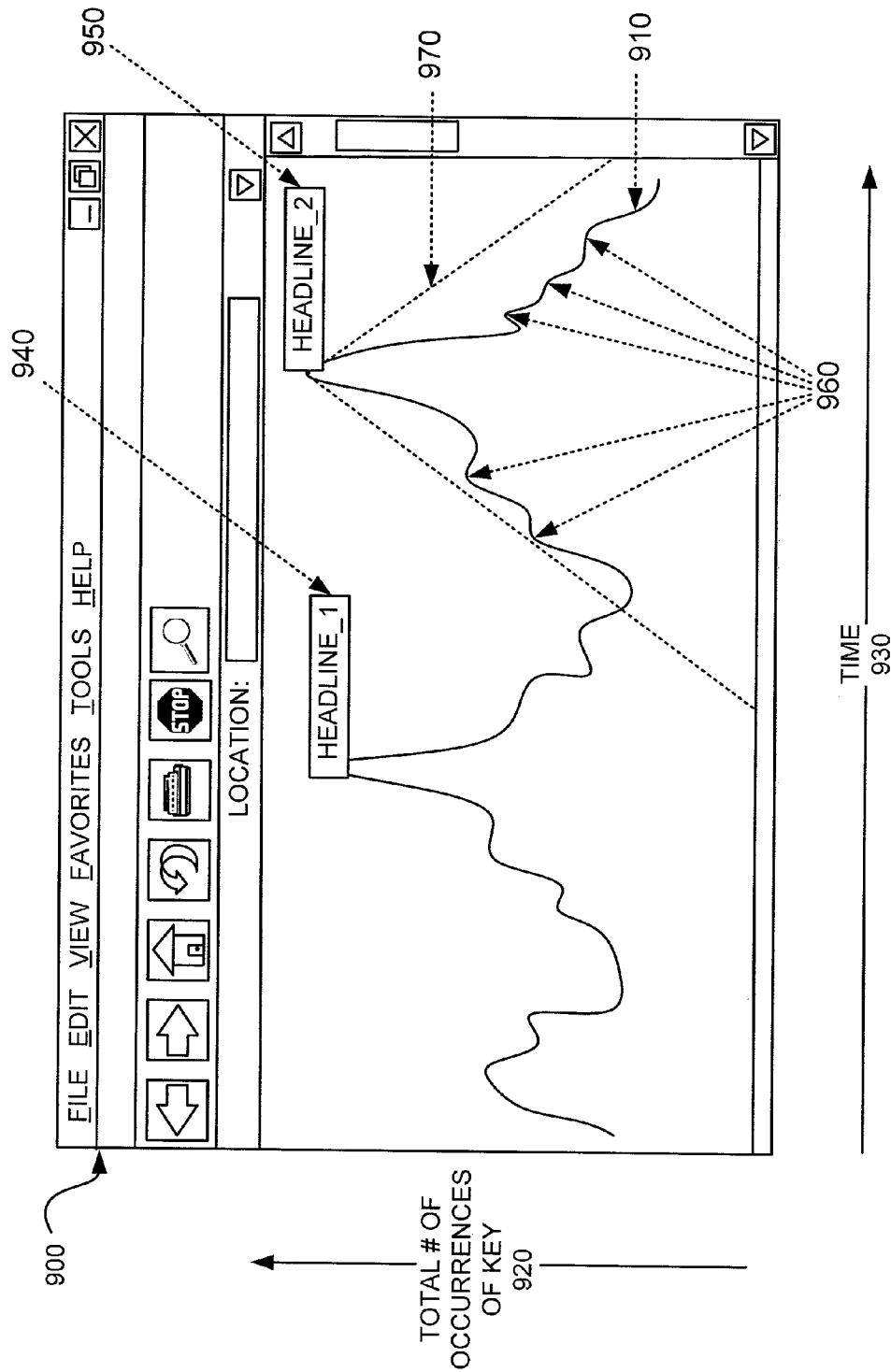
FIG. 9 is a diagram of an exemplary historic news graph, consistent with principles of the invention, with peaks of the graph labeled with the most relevant news headlines.

A number of occurrences of the key in news documents per timestamp may be graphed over a period of time (block 440). For each timestamp, a total number of occurrences of the key in all of the relevant news documents may be determined, and then graphed. As shown in FIG. 9, a document 900 may be provided to a user that includes a plot 910 of the total number of occurrences 920 of a given key on a y-axis versus time 930 on the x-axis.

One or more peaks on the graph may be labeled with a highest scoring headline for a corresponding timestamp (block 445). The headline 620 from data structure 800 that corresponds to the highest score 820 among all of the scores for the timestamp, may be retrieved and used to label a peak on the graph. As shown in FIG. 9, one or more peaks may be labeled with a highest scoring headline 940 or 950 for the timestamp that corresponds to each peak. In some implementations, a headline for labeling a given peak may be selected by identifying the headline that has a higher score than the score of any other headline divided by some measure of a distance in time between headlines. Each peak, thus, may have a "shadow" in which other lower peaks are ignored. Therefore, highest scoring headlines for all "local" peaks of a graph may be collected, and other peaks in the "shadow" (e.g., a region extending beneath and to either side of the local peak) of each of these peaks may not be labeled (i.e., peaks in the shadow of a given peak are probably about the same event and, thus, can be ignored). For example, as shown in FIG. 9, several local peaks 960 in the shadow 970 of the peak labeled with HEADLINE_2 950 may not be labeled.

CONCLUSION

Systems and methods consistent with principles of the invention permit a user to analyze the occurrence of news events over time. Given a user query, aspects of the invention may provide a graph that plots a number of times a word, phrase or sentence of the query occurs in documents, having news content, per unit time over a span of time. The graph, in addition to showing the user how many times the word, phrase or sentence has occurred in news content documents per unit time, labels peaks in the graph with the most relevant headlines for that specific point in time.

The foregoing description of implementations consistent with principles of the invention provides illustration and description, but is not intended to be exhaustive or to limit the invention to the precise form disclosed. Modifications and variations are possible in light of the above teachings, or may be acquired from practice of the invention. For example, while a series of acts has been described with regard to FIGS. 4A and 4B, the order of the acts may be modified in other implementations consistent with the principles of the invention. Further, non-dependent acts may be performed in parallel. Aspects of the invention may be used to plot other parameters other than a number of occurrences of a word, phrase, or sentence in a corpus of news documents. For example, aspects of the invention may be applied to graphing a stock price and labeling any sudden moves in the stock price based on changes in headline word frequencies.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   determining, by one or more processors, a plurality of documents relating to a query,
      the plurality of documents being associated with a plurality of timestamps;
   determining, by the one or more processors, a first group of documents, of the plurality of documents, associated with a first timestamp of the plurality of timestamps;
   determining, by the one or more processors, a particular quantity of times that one or more forms of the query are included in the first group of documents;
   identifying, by the one or more processors, a first document of the first group of documents;
   labeling, by the one or more processors, a first point on a graph by using a first headline associated with the first document,
      the first point corresponding to the first timestamp and a value based on the particular quantity of times, and
      the value based on the particular quantity of times satisfying a particular threshold;
   determining, by the one or more processors, a second group of documents, of the plurality of documents, associated with a second timestamp of the plurality of timestamps;
   identifying, by the one or more processors, a second document of the second group of documents;
   labeling, by the one or more processors, a second point on the graph by using a second headline associated with the second document,
      the second point corresponding to the second timestamp,
      the graph including a plurality of points,
      the plurality of points including the first point, the second point, and two or more other points, and
      the two or more other points being below the first point and the second point on the graph; and
   providing, by the one or more processors, the graph as a response to the query.

2. The method of claim 1, where identifying the first document includes:
   extracting headlines from the first group of documents to obtain a group of headlines,
      the group of headlines including the first headline,
   determining scores for the first group of documents based on the group of headlines, and
   identifying the first document based on the scores determined for the first group of documents.

3. The method of claim 2, where determining the scores includes:

determining, for the first headline, a quantity of times that a word included in the first headline occurs in the group of headlines, and determining a score, of the scores, for the first document based on the quantity of times that the word included in the first headline occurs in the group of headlines.

4. The method of claim 1, where determining the particular quantity of times that the one or more forms of the query are included in the first group of documents includes:

determining the particular quantity of times that a word included in the query is included in the first group of documents, and where identifying the first document includes:

determining that a quantity of times that the word is included in the first document is greater than a quantity of times that the word is included in other documents of the first group of documents, and identifying the first document based on the quantity of times that the word is included in the first document being greater than the quantity of times that the word is included in the other documents.

5. The method of claim 1, where identifying the first document includes:

determining that a quantity of times that the one or more forms of the query are included in the first headline associated with the first document is greater than a quantity of times that the one or more forms of the query are included in other headlines associated with other documents of the first group of documents, and identifying the first document based on the quantity of times that the one or more forms of the query are included in the first headline associated with the first document being greater than the quantity of times that the one or more forms of the query are included in the other headlines associated with the other documents.

6. The method of claim 1, where the one or more forms of the query comprise one or more of:

a word included in the query, a phrase included in the query, or a sentence included in the query.

7. The method of claim 1, where the method further comprises:

determining another quantity of times that the one or more forms of the query are included in second headlines of the second group of documents; and identifying the second headline that is associated with the second document based on a quantity of times that the one or more forms of the query are included in the second headline being greater than a quantity of times that the one or more forms of the query are included in any other headline of the second group of documents, where the second point further corresponds to another value based on the other quantity of times, and where the other value is based on the other quantity of times satisfying the particular threshold.

8. A system comprising:

one or more processors to:

determine a plurality of documents relating to a query, the plurality of documents being associated with a plurality of timestamps;

determine a first group of documents, of the plurality of documents, associated with a first timestamp of the plurality of timestamps;

determine a particular quantity of times that one or more forms of the query are included in the first group of documents;

identify a first document of the first group of documents;

label a first point on a graph by using a first headline associated with the first document, the first point corresponding to the first timestamp and a value based on the particular quantity of times, and the value based on the particular quantity of times satisfying a particular threshold;

determine a second group of documents, of the plurality of documents, associated with a second timestamp of the plurality of timestamps;

identify a second document of the second group of documents;

label a second point on the graph by using a second headline associated with the second document, the second point corresponding to the second timestamp, the graph including a plurality of points, the plurality of points including the first point, the second point, and two or more other points, and the two or more other points being below the first point and the second point on the graph; and provide the graph as a response to the query.

9. The system of claim 8, where, when identifying the first document, the one or more processors are to:

read headlines from the first group of documents to obtain a group of headlines, the group of headlines including the first headline, determine scores for the group of headlines, and identify the first document based on the scores determined for the group of headlines.

10. The system of claim 9, where, when determining the scores, the one or more processors are to:

determine, for the first headline, a quantity of times that a word included in the first headline occurs in the group of headlines, and determine a score, of the scores, for the first headline based on the quantity of times that the word included in the first headline occurs in the group of headlines.

11. The system of claim 8, where, when determining the particular quantity of times that the one or more forms of the query are included in the first group of documents, the one or more processors are to:

determine the particular quantity of times that a word included in the query is included in the first group of documents; and where, when identifying the first document, the one or more processors are to:

determine that a quantity of times that the word is included in the first document is greater than a quantity of times that the word is included in other documents of the first group of documents, and identify the first document based on the quantity of times that the word is included in the first document being greater than the quantity of times that the word is included in the other documents.

12. The system of claim 8, where, when identifying the first document, the one or more processors are to:

determine that a quantity of times that the one or more forms of the query are included in the first headline associated with the document is greater than a quantity of times that the one or more forms of the query are included in other headlines associated with other documents of the first group of documents, and identify the first document based on the quantity of times that the one or more forms of the query are included in the first headline associated with the document being greater than the quantity of times that the one or more forms of the query are included in the other headlines associated with the other documents.

13. The system of claim 8, where the one or more forms of the query comprise one or more of:
a word included in the query,
a phrase included in the query, or
a sentence included in the query.

14. The system of claim 8,
where the one or more processors are to:
determine another quantity of times that the one or more forms of the query are included in the second group of documents, and
where the second point on the graph further corresponds to another value based on the other quantity of times.

15. A non-transitory computer-readable medium storing instructions, the instructions comprising:
one or more instructions that, when executed by one or more processors, cause the one or more processors to:
determine a plurality of documents relating to a query,
the plurality of documents being associated with a plurality of timestamps;
determine a first group of documents, of the plurality of documents, associated with a first timestamp of the plurality of timestamps;
determine a particular quantity of times that one or more forms of the query are included in the first group of documents;
identify a first document of the first group of documents;
label a first point on a graph by using a first headline associated with the first document,
the first point corresponding to the first timestamp and a value based on the particular quantity of times, and
the value based on the particular quantity of times satisfying a particular threshold;
determine a second group of documents, of the plurality of documents, associated with a second timestamp of the plurality of timestamps;
identify a second document of the second group of documents;
label a second point on the graph by using a second headline associated with the second document,
the second point corresponding to the second timestamp,
the graph including a plurality of points,
the plurality of points including the first point, the second point, and two or more other points, and
the two or more other points being below the first point and the second point on the graph; and
provide the graph as a response to the query.

16. The non-transitory computer-readable medium of claim 15, where the one or more instructions to identify the first document include:
one or more instructions that, when executed by the one or more processors, cause the one or more processors to:
identify headlines from the first group of documents to obtain a group of headlines,
the group of headlines including the first headline,
determine scores for the group of headlines, and
identify the first document based on the scores determined for the group of headlines.

17. The non-transitory computer-readable medium of claim 16, where the one or more instructions to determine the scores include:
one or more instructions that, when executed by the one or more processors, cause the one or more processors to:
determine, for the first headline, a quantity of times that a word included in the first headline occurs in the group of headlines, and
determine a score, of the scores, for the first headline based on the quantity of times that the word included in the first headline occurs in the group of headlines.

18. The non-transitory computer-readable medium of claim 15,
where the one or more instructions to determine the particular quantity of times that the one or more forms of the query are included in the first group of documents include:
one or more instructions that, when executed by the one or more processors, cause the one or more processors to:
determine the particular quantity of times that a word included in the query is included in the first group of documents, and
where the one or more instructions to identify the first document include:
one or more instructions that, when executed by the one or more processors, cause the one or more processors to:
determine that a quantity of times that the word is included in the first document is greater than a quantity of times that the word is included in other documents of the first group of documents, and
identify the first document based on the quantity of times that the word is included in the first document being greater than the quantity of times that the word is included in the other documents.

19. The non-transitory computer-readable medium of claim 15, where the one or more instructions to identify the first document include:
one or more instructions that, when executed by the one or more processors, cause the one or more processors to:
determine that a quantity of times that the one or more forms of the query are included in the first headline associated with the first document is greater than a quantity of times that the one or more forms of the query are included in other headlines associated with other documents of the first group of documents, and
identify the first document based on the quantity of times that the one or more forms of the query are included in the first headline associated with the first document being greater than the quantity of times that the one or more forms of the query are included in the other headlines associated with the other documents.

20. The non-transitory computer-readable medium of claim 15,
where the one or more instructions to label the second point on the graph comprise:
one or more instructions that, when executed by the one or more processors, cause the one or more processors to:
determine another quantity of times that the one or more forms of the query are included in the second group of documents; and
label, based on the other quantity of times, the second point on the graph by using the second headline associated with the second document.

* * * * *